US009788071B2

(12) United States Patent
Mason et al.

(10) Patent No.: US 9,788,071 B2
(45) Date of Patent: Oct. 10, 2017

(54) ANNOTATING AND INDEXING BROADCAST VIDEO FOR SEARCHABILITY

(71) Applicant: Microsoft Technology Licensing, LLC, Redmond, WA (US)

(72) Inventors: Joanna Mason, Redmond, WA (US); Craig J. Wheeler, Woodinville, WA (US); Daniel Av, Kirkland, WA (US); Michael Ahmed Sengan Siebert, Seattle, WA (US); Gregory M. Smith, Seattle, WA (US); Antonio Vargas Garcia, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/676,747

(22) Filed: Apr. 1, 2015

(65) Prior Publication Data
US 2016/0127795 A1    May 5, 2016

Related U.S. Application Data (60) Provisional application No. 62/074,595, filed on Nov. 3, 2014.

(51) Int. Cl.
*H04N 5/445* (2011.01)
*H04N 21/482* (2011.01)
(Continued)

(52) U.S. Cl.
CPC ..... *H04N 21/4828* (2013.01); *G06F 17/3082* (2013.01); *G06F 17/30843* (2013.01);
(Continued)

(58) Field of Classification Search
CPC .......... H04N 5/44543; H04N 21/4828; H04N 21/482
(Continued)

(56) References Cited

U.S. PATENT DOCUMENTS 6,357,042 B2   3/2002  Srinivasan et al.
7,624,416 B1  11/2009  Vandermolen et al.
(Continued)

OTHER PUBLICATIONS

ISA European Patent Office, International Search Report and Written Opinion Issued in PCT Application No. PCT/US2015/057915, Jan. 21, 2016, WIPO, 11 Pages.
(Continued)

*Primary Examiner* — Annan Shang
(74) *Attorney, Agent, or Firm* — Alleman Hall Creasman & Tuttle LLP (57) ABSTRACT

A method providing searchable streaming video broadcasts via an interactive media server, the interactive media server generates a live broadcast video stream for each of a plurality of interactive media sessions and a video provider server providing a connection to the live broadcast video stream for viewing, the method comprising receiving an interactive media events stream for each interactive media session from the interactive media server, generating statistics data for each interactive media session based upon the events stream, and generating a searchable index of a directory of the live broadcast video streams, the searchable index including a plurality of entries, each entry including (a) a link to the live broadcast video stream for a corresponding interactive media session provided by the video provider server, and (b) metadata associated with the corresponding interactive media session, the metadata generated based upon the statistics data for the corresponding interactive media session.

18 Claims, 6 Drawing Sheets

(51) Int. Cl.
G06F 17/30 (2006.01)
H04N 21/258 (2011.01)
H04N 21/845 (2011.01)
H04N 21/8545 (2011.01)

(52) U.S. Cl.
CPC . *G06F 17/30858* (2013.01); *H04N 21/25891* (2013.01); *H04N 21/8456* (2013.01); *H04N 21/8545* (2013.01)

(58) Field of Classification Search
USPC .................................. 725/37–116; 709/219
See application file for complete search history.

(56) References Cited

U.S. PATENT DOCUMENTS

| | | | |
|---|---|---|---|
| 7,965,923 B2 | 6/2011 | Sarukkai | |
| 8,036,514 B2 | 10/2011 | Barton et al. | |
| 8,126,897 B2 * | 2/2012 | Sznajder | G06F 17/30858 706/11 |
| 8,250,616 B2 * | 8/2012 | Davis | H04N 7/17318 725/87 |
| 8,311,832 B2 | 11/2012 | Miyamoto et al. | |
| 8,381,246 B2 * | 2/2013 | Skog | H04N 21/4314 709/219 |
| RE44,095 E * | 3/2013 | Sanchez | 463/40 |
| 8,407,744 B2 * | 3/2013 | Moon | H04N 7/17318 725/136 |
| 8,615,782 B2 * | 12/2013 | Schein | H04N 5/44543 725/110 |
| 8,621,514 B2 * | 12/2013 | Yao | H04N 21/235 348/564 |
| 8,689,251 B1 | 4/2014 | Heath | |
| 8,707,381 B2 | 4/2014 | Polumbus et al. | |
| 8,727,892 B1 * | 5/2014 | Chun | G07F 17/3276 463/25 |
| 8,930,999 B1 * | 1/2015 | Maeng | H04N 5/445 709/219 |
| 8,984,562 B2 * | 3/2015 | Charania | H04N 21/4312 725/2 |
| 9,177,435 B2 * | 11/2015 | Arnone | G06F 21/552 |
| 9,426,509 B2 * | 8/2016 | Ellis | H04H 60/31 |
| 2001/0001160 A1 * | 5/2001 | Shoff | H04N 5/44543 725/51 |
| 2003/0052148 A1 * | 3/2003 | Rajala | B65H 23/048 226/44 |
| 2004/0024886 A1 * | 2/2004 | Saxena | H04N 7/165 709/229 |
| 2004/0148638 A1 * | 7/2004 | Weisman | G06Q 30/0243 725/115 |
| 2005/0235319 A1 * | 10/2005 | Carpenter | H04N 5/44543 725/52 |
| 2006/0259984 A1 * | 11/2006 | Juneau | H04L 67/18 726/28 |
| 2007/0016559 A1 * | 1/2007 | Kraft | G06F 17/30867 |
| 2007/0300258 A1 | 12/2007 | O'Connor et al. | |
| 2008/0201227 A1 * | 8/2008 | Bakewell | G06Q 30/0217 705/14.19 |
| 2008/0235749 A1 * | 9/2008 | Jain | H04N 7/17318 725/114 |
| 2008/0244638 A1 | 10/2008 | Ryden | |
| 2009/0043788 A1 | 2/2009 | Averbuch et al. | |
| 2009/0089352 A1 * | 4/2009 | Davis | G06Q 10/00 709/201 |
| 2009/0094286 A1 | 4/2009 | Lee et al. | |
| 2010/0293187 A1 | 11/2010 | Biehn et al. | |
| 2011/0179445 A1 | 7/2011 | Brown et al. | |
| 2012/0089410 A1 * | 4/2012 | Mikurak | G06Q 10/00 705/1.1 |
| 2012/0254917 A1 * | 10/2012 | Burkitt | G06F 17/30817 725/40 |
| 2012/0309515 A1 * | 12/2012 | Chung | H04N 21/274 463/31 |
| 2013/0036433 A1 * | 2/2013 | Ellis | G06F 3/0481 725/14 |
| 2013/0160051 A1 | 6/2013 | Armstrong et al. | |
| 2014/0040273 A1 * | 2/2014 | Cooper | G06F 17/3002 707/741 |
| 2014/0059053 A1 | 2/2014 | Giblin | |
| 2014/0075465 A1 | 3/2014 | Petrovic et al. | |
| 2014/0129942 A1 * | 5/2014 | Rathod | H04N 21/44222 715/720 |
| 2015/0269525 A1 * | 9/2015 | Hazy | G06Q 10/06393 434/237 |
| 2016/0375361 A1 * | 12/2016 | Brenden | A63F 13/27 463/31 |

OTHER PUBLICATIONS

IPEA European Patent Office, Second Written Opinion Issued in PCT Application No. PCT/US2015/057915, Sep. 29, 2016, WIPO, 6 Pages.

IPEA European Patent Office, International Preliminary Report on Patentability Issued in PCT Application No. PCT/US2015/057915, Jan. 16, 2017, WIPO, 7 Pages.

Coden, et al., "Multi-Search of Video Segments Indexed by Time-Aligned Annotations of Video Content", In Technical Report RC21444, Jan. 1, 1998, 12 pages.

"Searching TV Programs Using Teletext Subtitles", Retrieved on: Oct. 29, 2014 Available at: https://www.google.co.in/url?sa=t&rct=j &q=&esrc=s&source=web&cd=3&cad=rja&uact=8 &ved=0CC8QFjAC&url=http%3A%2F%2Fwww.paulmckevitt. com%2Fdocs%2Freadings%2Feunicemsc%2Feunicemsc.doc &ei=qfNRVJvpHo7M8gW9-IGQDA &usg=AFQjCNE0267BqgZB-BbjN-pPXq-A2dLuNA&bvm=bv. 78597519,d.dGc.

George, Daniel., "Twitch Live Annotations Let Youtube Viewers Know You're Streaming Live", Published on: Jun. 20, 2014 Available at: http://gamesided.com/2014/06/20/twitch-live-annotations-let-youtube-viewers-know-youre-streaming-live/.

"XSplit Gamecaster", Published on: Aug. 9, 2014 Available at: https://www.xsplit.com/products/gamecaster?lang=en.

Murphy, Shannon K., "How to Maximize YouTube Viewership with the Help of Transcripts and Captions", Apr. 12, 2013 Available at: http://www.3playmedia.com/2013/04/12/how-maximize-youtube-viewership-help-transcripts-captions/.

* cited by examiner

Game Title

Filter By
All         Character type
Map
Match Type

☒

Map
Brush Creek    4
Deep Valley   29
Tropical Island  100

ANNOTATING AND INDEXING BROADCAST VIDEO FOR SEARCHABILITY

CROSS REFERENCE TO RELATED APPLICATION

This application claims priority to U.S. provisional patent application, Ser. No. 62/074,595, entitled "ANNOTATING AND INDEXING GAME VIDEO FOR SEARCHABILITY" filed on Nov. 3, 2014, the entire disclosure of which is herein incorporated by reference.

BACKGROUND

Among interactive media enthusiasts, such as computer game enthusiasts, broadcasting live video and uploading video clips of computer interactive media sessions (e.g., game sessions) is widely popular. In one known hosting system, users post links to live video streams and/or video clips of insession video (e.g., in-game video) to a hosting site, for viewing by other users. In the known hosting system, this video data is organized by channels, each channel being established by a user, and typically organized around a theme such as a particular game title. Within each channel, the user that curates the channel may post links to live video and video clips of in-session video, which may be viewed by viewers who view the videos in the channel.

One drawback with such systems is that a large amount of video is generated by users, and it can be incredibly difficult for users to find a specific video to watch. Video content is created and uploaded by users from various disparate gaming platforms to the hosting system, and users craft titles of their video feeds, clips, and channels. The hosting system includes a search tool that enables users to enter keyword search queries to be matched against the textual titles of the live video feeds, video clips, and channels. While this provides users some ability to locate content, the textual titles of the videos themselves are subject to the whims of individual users and thus the content returned in a search query is often not relevant to the viewer, or is too voluminous to be helpful. Further, such an approach to searching interactive media video is limited to the small amount of textual information that can be contained in the title of each file. Typically, the title is a short string that is derived from the file name for the video data file. As a consequence of these drawbacks, viewers may be forced to sort through a large number of files when searching for relevant interactive media video and in many cases may not find content which is relevant to them despite the search.

SUMMARY

A method is disclosed herein for providing searchable video data generated from a plurality of interactive media sessions at an interactive media server. The method is used in an environment in which the interactive media server generates a live broadcast video stream for each of the interactive media sessions and a video provider server provides a connection to the video data for viewing by others. The method may comprise, at a media statistics server, receiving an interactive media events stream for each interactive media session from the interactive media server, and generating statistics data for each interactive media session based upon the events stream. The method may further comprise generating a searchable index of a directory of the live broadcast video streams, the searchable index including a plurality of entries, each entry including (a) a link to the live broadcast video stream for a corresponding interactive media session provided by the video provider server, and (b) metadata associated with the corresponding interactive media session, the metadata being generated based upon the statistics data for the corresponding interactive media session. The method may further include processing a search query using the index to thereby generate and return one or more search results. Each search result may include a link to corresponding live broadcast video stream provided by the video provider server for which metadata relevant to the search query was determined to exist.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Methods providing refined searches of live broadcast video streams of interactive media sessions are described herein. In one exemplary method, media statistics data which may be in the form of metadata is generated during the interactive media session in tandem with the live broadcast video stream via a media statistics server. The statistics data can be generated in near real-time, to decrease delays in downstream search queries, if desired. The statistics data is subsequently indexed for search queries via an indexing server and linked to a live broadcast video stream provided by a directory server and/or video provider server. A search interface can then be provided to search the statistics data which is linked to the live video streams of the interactive media sessions. In this way, relevant statistical data can be generated during broadcast of an interactive media session and used for subsequent search, enabling a user to quickly search through a large database providing streaming interactive media sessions and find content which is relevant to them in the database without unnecessary sorting through broadcasts. As a result, search operation of live interactive media session video streams is improved.

Figure 1:
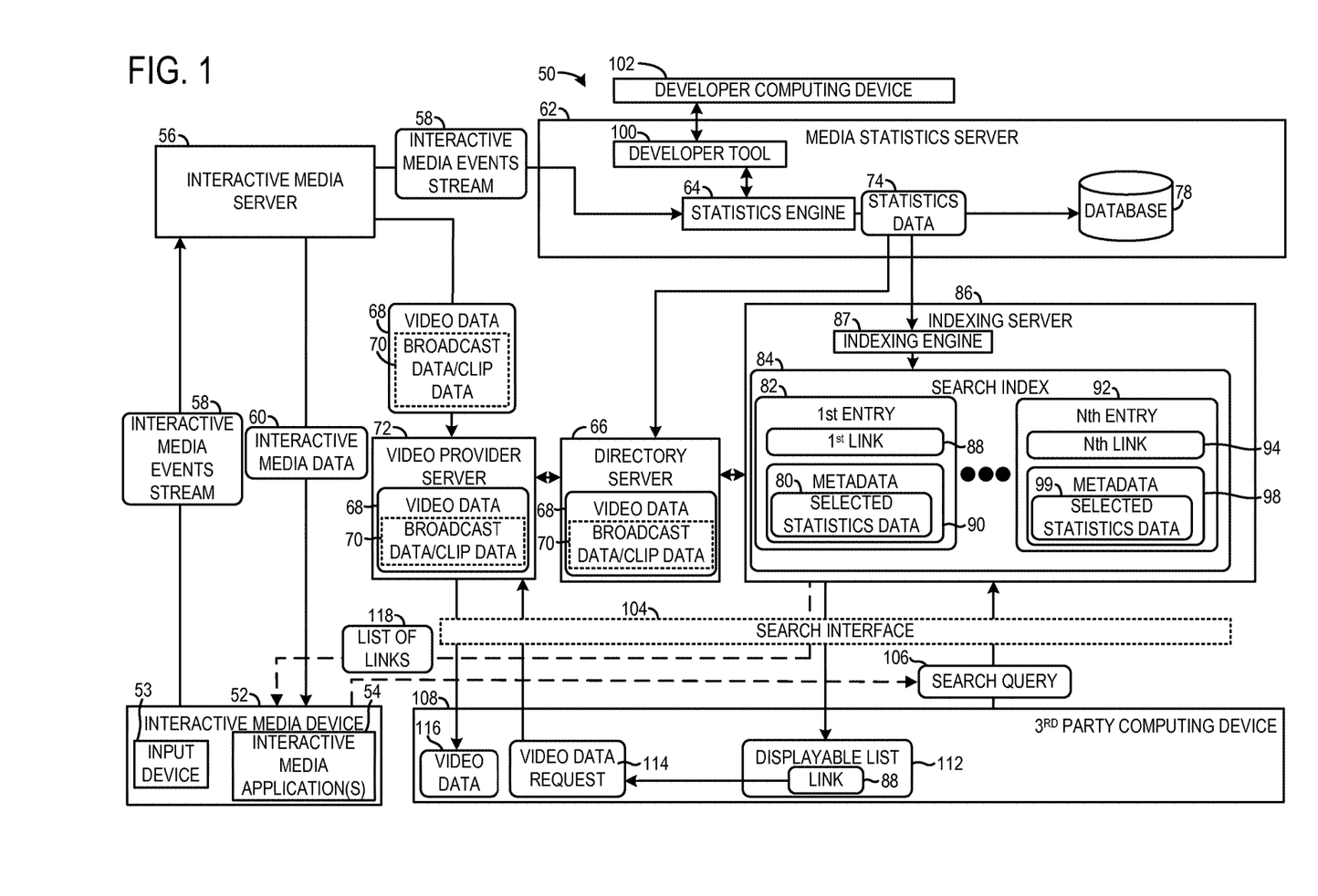
FIG. 1 shows a schematic depiction of a system for annotating interactive media broadcasts and media clips with searchability.

FIG. 1 shows a schematic depiction of a system 50 for providing searchable video data generated from a plurality of interactive media sessions at an interactive media server. The interactive media server may be a game server, in one example. An interactive media session herein is defined as an interactive session generated by gaming media device in response to user input with an interactive media application. Thus, the interactive media session may include a plurality of user inputs which adjust or alter different aspects of an interactive media application. Thus, the interactive media session may include a plurality of user inputs, interactive media events, etc. It will be appreciated that in one example, the interactive media session may be a gaming session generated based on a user's interaction with a gaming application executed via a gaming device.

The system includes an interactive media server 56 that generates video data 68 for each of the interactive media sessions and a video provider server 72 that provides a connection to the video data 68 for viewing. The video data 68 may include a live broadcast video stream corresponding to an interactive media session as well as video clips associated with the interactive media session. In this way, streaming broadcast video corresponding to a user's interactive media session can be generated by the interactive media server 56. The live broadcast video streams capture live interactive media sessions of interactive media applications. For instance, an interactive media session may include adjustment of a gaming environment generated through execution of an interactive media application in response to user input received via the interactive media device 52. The video data may also include long form recorded video content and/or video clips, in one example. Thus, the video data may include recording of previous live broadcasts. Still further in another example, the video data 68 on the video provider server 72 may include a data link to the video streams broadcast via the interactive media server 56 and/or interactive media device 52.

The system 50 includes the interactive media device 52, such as a game console, tablet, smartphone, etc., configured to run one or more interactive media applications 54. It will be appreciated that the device running the interactive media application(s) enable a user to interact with a user interface to generate visual feedback. Like all computing devices described herein, the interactive media device typically includes at least one processor and associated non-volatile memory for storing software programs, the processor being configured to execute the stored software programs using portions of associated volatile memory to achieve the various functions described herein. The non-volatile memory may be a CD-ROM, ASIC, FLASH, hard drive, or other storage device that when power is turn off, retains the data stored therein. The volatile memory may, for example, be a form of RAM.

The interactive media device 52 may further include an input device 53. The input device 53 may include one or more of a controller having button(s) and/or joystick(s), a keyboard, a mouse, a trackpad, a touch screen, a touch pad, a microphone, a video camera, etc. Thus in one example, the interactive media device may receive audio input from a microphone. In such an example, a user may provide commentary regarding an interactive media session. However, other types of audio input have been contemplated. For instance, the audio input may trigger adjustments in an interactive media application. In another example, the interactive media device may receive video input from a video camera. The video input may be associated with the aforementioned audio commentary, in one example, and therefore can be synchronized with the audio commentary. In this way, a user can record audio and video commentary related to an interactive media session. The audio and/or video commentary may be included in the video data 68, described in greater detail herein. However, in other example the video input may trigger adjustments in an interactive media application.

The interactive media device 52 may also include one or more interactive media applications 54. Thus, the interactive media device 52 is configured to execute one or more interactive media applications. It will be appreciated that the interactive media applications may be gaming applications such as role playing games, first person perspective games, open world games, 2-dimensional games, mobile games, etc. However, numerous types of interactive media applications have been contemplated.

The interactive media device 52 is in electronic communication with an interactive media server 56 via a computer network. Although a single interactive media device 52 is shown it will be appreciated that a plurality of interactive media devices may be in electronic communication with the interactive media server. Additionally, the interactive media device 52 may execute a multitude of interactive media applications. In the example described herein, interactive media device 52 is used to interact with interactive media server 52 and generate the video data 68, and the video data is viewed via third party computing device 108. However, it will also be appreciated that in other scenarios the interactive media device 52 itself may also view the video data 68.

During an interactive media session, the interactive media server 56 receives an interactive media events stream 58 sent from the interactive media device 52. The interactive media events stream 58 may include actions and events executed in the interactive media application, and may include user input from one or more user input devices of the interactive media device 52, such as a touchscreen, keyboard, mouse, controller, etc. Following processing by the gaming server, the interactive media device 52 receives interactive media 60 from the interactive media server 56. Based upon the received interactive media data 60, the interactive media application 54 displays a state of the interactive media application on a display associated with the interactive media device. The state of the interactive media application continuously changes under the influence of media program logic and user inputs. In this way, the interactive media device implements an interactive media session of a server-based interactive media application that is hosted by interactive media server 56, which may be a one-player, two-player, or multi-player game.

To enable third parties and/or first party gainers themselves to view video of each interactive media session hosted by interactive media server 56, the interactive media server 56 is also configured to generate and send video data 68 to a video provider server 72, which provides a connection to the video data for downloading/streaming by clients. In one example, the video provider server 72 may host the video data 68. Thus, the video provider server 72 can include the video data 68 including broadcast data and/or clip data 70. However, in other examples the video provider server 72 may provide a data link between the broadcasting interactive media device 52, the interactive media server 56 broadcasting the video data, and/or a $3^{rd}$ party computing device. In such an example the video data 68 sent to the video provider server 72 and directory server 66 may include a data link which may be stored in an internal cache in the video provider server 72. Therefore, the video data stored on the video provider server 72 may be a data link and the interactive media server 56 and/or interactive media device 52 that may host video data including broadcast data and/or clip data. In other envisioned architectures, the video data 68 may be hosted by the interactive media server 56 or the interactive media device 52.

The video data 68 may include broadcast data (e.g., live broadcast video stream) and/or clip data (i.e., downloadable video data) 70. Additionally or alternatively, the video data 68 may include a data link configured to connect a $3^{rd}$ party computing device to the device broadcasting the live video stream, such as the interactive media server 56 and/or the interactive media device 52. Each item of video data 68 corresponds to a specific interactive media session provided by the interactive media server 56. The broadcast data may be a live video stream that is broadcast of the interactive media session, and the clip data may be a stored video file of predetermined length that the video provider server 72 is configured to provide connection to for download. Specifically in one example, the video data may include only a live broadcast video stream.

The interactive media server 56 is configured to send the interactive media events stream 58 to a media statistics server 62. In particular, the interactive media events stream interactive media events stream 58 may be sent to a statistics engine 64 in the media statistics server 56. The statistics engine 64 is configured to generate statistics data 74 based on the interactive media events stream 58 and send the statistics data 74 to an indexing server 86, directory server 66, and a database 78. In one example, the statistics engine 64 may send only a portion of the statistics data to the indexing server 86. The statistics data 74 may include virtually any suitable data related to the interactive media session that is provided by the interactive media server. As some examples, the statistics data may include one or more of map type, weapon type, tool type, points data, character data, and level data. The indexing server 86 and specifically the indexing engine 87 is configured to index the contents of the directory within the director server 66, and store the results in a search index 84, that is updated periodically. Rapid updates, such as every 30 seconds, keep the search index fresh and current, reflecting the current state of the directory server 66. The search index typically includes an entry for each directory entry in the directory server. Thus, for each link stored in the directory server to video data provided by the video provider server 72, a corresponding entry such as entry 82 and entry 92 is created. In the depicted example, the Pt link 88 and Nth link 94 are illustrated as stored within the $1^{st}$ entry 82 and Nth entry 92 in the search index. Along with each link 82, 92, the search index entries also contain a corresponding metadata 90, 98 that has been generated based upon selected statistics data 80, 99 for each respective interactive media session that is associated with the linked video data stored on the video provider server 72 and specifically live broadcast video streams stored in the video provider server. The metadata may include a time stamp having a date and/or time which may correspond to a temporal location in the video, as appropriate. In one example, there may be multiple statistics associated with a single time stamp. Thus, more than one type of metadata may be associated with each time stamp, in such an example. In one example, the directory server 66 and video provider server 72 may jointly manage hosting of the broadcast video data which is provided to a $3^{rd}$ party. For instance, the directory server 66 may provide broadcast video data to the video provider server 72 in response to receiving a request from the indexing server 86. However, additional or alternate techniques for managing the live broadcast video streams have been contemplated. For instance, the directory server 66 and/or video provider server 72 may jointly provide video data including a data link stored in an internal cache, the data link providing a connection between a $3^{rd}$ party computing device and the device/server (e.g., interactive media server 56 and/or interactive media device 52) broadcasting the video streams associated with an interactive media session.

As shown, a plurality of data entries 82, 92 each with a corresponding a link 88, 94 to video data for each interactive media session, and metadata 90, 98 based upon and/or including the selected statistics data 80, 99 may be generated by the indexing server 86 based on the statistical data received by the indexing server for each interactive media session. It will be appreciated that the different entries in the search index 84 may be generated for different interactive media sessions hosted by interactive media server 56 and implemented via the interactive media device 52.

The media statistics server 62 further includes a developer tool 100 and the system 50 further includes a developer computing device 102. The developer tool 100 is configured to enable the developer computing device 102 and therefore a developer to generate and/or alter statistics rules which are used to determine the selected portion of the statistics data the portion of the statistics data selected via the statistics engine 64 and/or the indexing engine 87. Therefore, a developer may send a rule change request from the device 102 to the developer tool which requests an adjustment in the way in which the portion of the statistics data is selected via the statistics engine 64 and/or indexing server 86. For example, some statistics may be set by the developer to be private, and not available for tagging as metadata linked to video data. Other statistics may be designated by the developer to be public, and thus available to be indexed as metadata for the video data on video provider server 72, within the search index 84. Additionally, the media statistics server 62 may be configured to inhibit indexing of the selected portion of the statistics data when an interactive media session is discontinued, for example, after a predetermined time period has passed, such as 10 minutes, or 5 minutes, since the last media session activity. This helps conserve server resources devoted to keeping interactive media session alive and streaming video.

Furthermore, the media statistics server 62 or the indexing server 86 is configured to provide a search interface 104 configured to receive a search query 106 from a $3^{rd}$ party computing device 108 (or interactive media device 52), look up one or more terms in the search query 106 in the search index 84, and send a displayable list 112 of one or more search results including the link 88 to the hosted video and/or the live broadcast video stream to the $3^{rd}$ party computing device (or interactive media device 52, as appropriate). Accordingly, it will be appreciated that the search interface 104 associated with the indexing server 86 may be accessible by a browser program via a computer network, such as the Internet. Further, the search interface may be an application programming interface (API) that is made available to interactive media developers, and the browser program may be integrated into an interactive media program executed on an interactive media device such as 52, in one example.

Selecting the link 88 may initiate a video data request 114 sent to the video provider server 72. In response to the video data request 114 the video provider server 72 sends video data 68 corresponding to the link to the $3^{rd}$ party computing device 108. The video data 68 may include a live broadcast video stream and/or a video clip from a live broadcast stream. In one example, the live broadcast video stream may be provided for viewing in near real-time. As a result, a user can be provided with video content which they are interested in viewing while the content is broadcasted live, improving the user's interactive experience. Therefore in one example, the video data request 114 may be a live broadcast video stream request.

Additionally, the indexing server 86 may be configured to automatically send a list of links 118 to video data (e.g., live broadcast video streams) provided by the video provider server 72 to the interactive media device 52 based on events generated in the interactive media session of the interactive media application executed by the interactive media device. This may be useful, for example, in providing in-session help to a user. In this example, if the interactive media application 54 determines that the user has taken too long to complete a challenge, the interactive media logic may determine to send a search query to the indexing server via the search interface 104 with search terms corresponding to the challenge on which the interactive media application is stuck and needs help/assistance. In one example, the interactive media application may automatically send a search query to the indexing server without user input when it is determined that a user needs help in an interactive media session. In response, the interactive media application 54 is configured to receive the list of links 118 that include live streaming and/or stored video clips that had associated metadata indicating they were related to the challenge. In this way, interactive media session help can be automatically provided to the user without user input, thereby improving a user's interactive experience. For instance, a user can be provided with video clips of a player overcoming a challenge in an interactive media session, such as completing a level, task, etc., in a gaming session. In some embodiments, the interactive media application may also ask for such video data that had metadata indicating high user feedback or creation by a highly experienced player. In this manner the quality assistance to be provided the user by the video data may be promoted.

Additionally, the video provider server 72 may be configured to generate various commands such as an "add broadcast" command and a "remove broadcast" command. The "add broadcast" command may be configured to add a live broadcast video stream to the video provider server 72 when a new live broadcast video stream is detected. Likewise, the "remove broadcast" command may be configured to remove a live broadcast video stream from the server when it is determined that the video stream has been discontinued for a duration of time (e.g., predetermined time period). Additionally, the media statistics server 62 may be configured to update statistics data 74 generated by the statistics engine 64 periodically. In some examples, the statistics data may be batched to reduce overloading of the indexing server 86. In other examples, the aforementioned commands may be implemented via the interactive media server 56.

Figure 2:
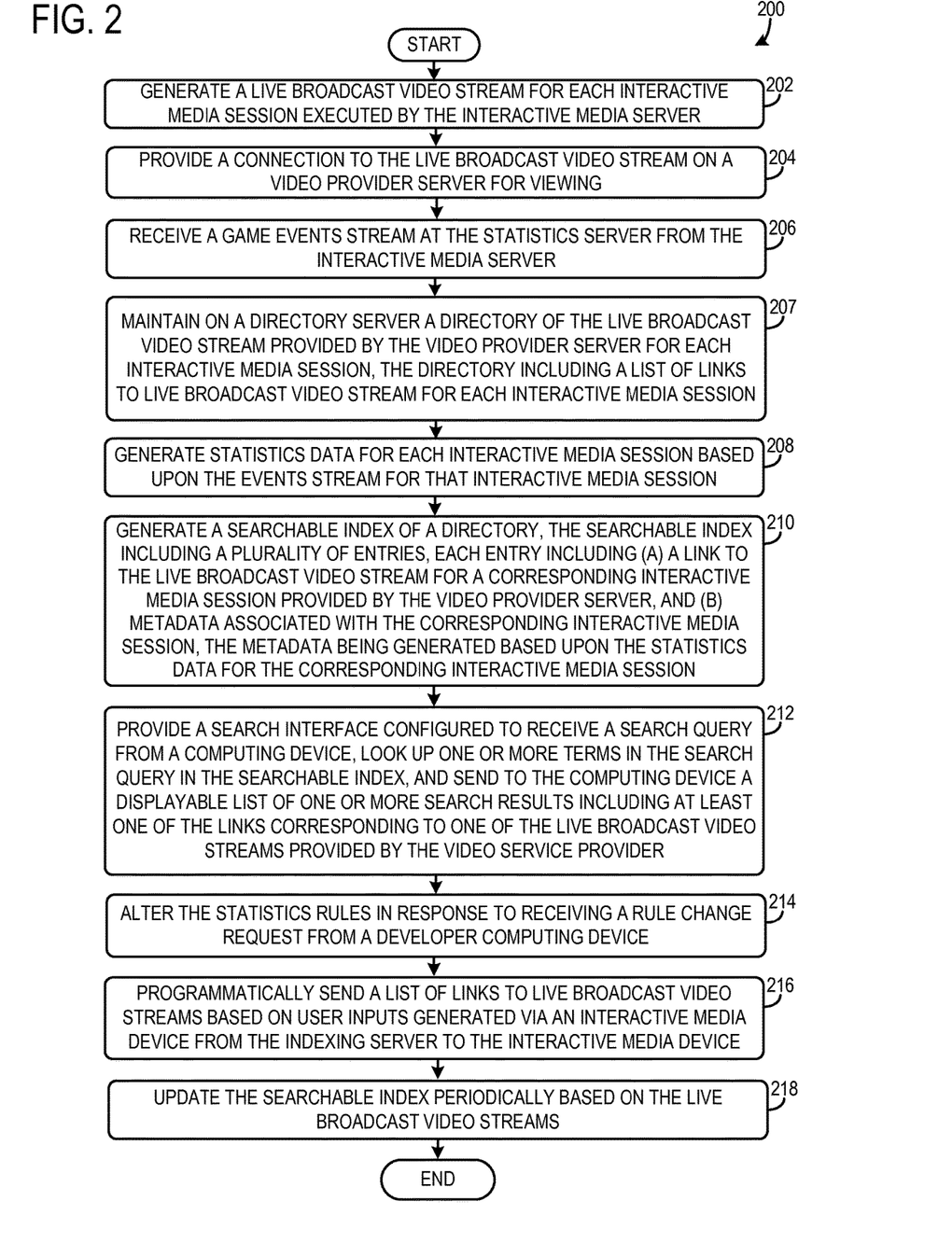
FIG. 2 shows a method for providing searchable video broadcast streams generated from interactive media sessions.

FIG. 2 shows a method 200 for providing searchable video data generated from interactive media sessions. The method may be implemented via the system 50 described above with regard to FIG. 1 or another suitable system. The method includes at 202 generating a live broadcast video stream for each interactive media session executed by the interactive media server. The live broadcast video stream is typically generated on the interactive media server, but may be generated elsewhere, such as at the media statistics server or video provider server. In this way, broadcast streams associated with interactive media sessions can be generated for live session viewing. Further in one example, the live broadcast video stream my include microphone input data and video input data from an interactive media device. For instance, a user may provide audio and/or video commentary regarding their current interactive media session. In this way, the live broadcast video stream is enhanced by gaming commentary.

The method further includes at 204 provide a connection to the live broadcast video stream on a video provider server for viewing. Providing the connection to the video stream enables a number of people to view the live video stream. In one example, providing a connection to the live broadcast video stream may include providing a data link to the interactive media server and/or interactive media device broadcasting the live video stream. At 206 the method includes at the media statistics server, receiving an interactive media events stream at the media statistics server from the interactive media server. At 207, the method includes maintaining on a directory server a directory of the live broadcast video stream provided by the video provider server for each interactive media session. The directory typically includes a list of links to live broadcast video stream for each interactive media session. Thus, the directory can act as a portal for live video viewing. At 208, the method includes generating statistics data for each interactive media session based upon the events stream for that interactive media session. Typically at least some of the statistics which are generated are selected based on rules set by the interactive media developer and media platform operator. Other statistics may be automatically generated, in one example.

At 210, the method includes generate a searchable index of the directory including a plurality of entries, each entry including (a) a link to the video data for a corresponding interactive media session, and (b) metadata associated with the corresponding interactive media session, the metadata being generated based upon the statistics data for the corresponding interactive media session. The indexing is typically performed periodically in near real-time, for example, every 30 seconds, so that the index keeps a current account of the contents of the directory, with each link to interactive media session video data being annotated with metadata derived from current interactive media statistics for the same interactive media session within the index, so that users can soon find relevant video data to view with search queries. Additionally, the step of generating the searchable index may be implemented via the indexing server. Further in one example, the metadata may be time stamped corresponding to a temporal location in the live broadcast video stream. In this way, the metadata can be temporally classified, enabling searches based on metadata to be further refined to improve searching operation.

At 212 the method includes providing a search interface configured to receive a search query from a computing device (such as a $3^{rd}$ party computing device or interactive media device), look up one or more terms in the search query in the searchable index, and send to the computing device a displayable list of one or more search results including at least one of the links corresponding to one of the live broadcast video streams provided by the video provider server. In one example, the search query may include filters and search options related to the metadata. In one example, the displayable list may include a plurality of links to live broadcasts, each link associated with a different interactive media session.

At 214 the method includes comprising altering the statistics rules in response to receiving a rule change request from a developer computing device. At 216 the method includes programmatically sending a list of links to live broadcast video streams based on user inputs generated via an interactive media device from the indexing server to the interactive media device. At 218 the method includes updating the searchable index periodically based on the live broadcast video streams.

In some embodiments, the methods and processes described herein may be tied to a computing system of one or more computing devices. In particular, such methods and processes may be implemented as a computer-application program or service, an application-programming interface (API), a library, and/or other computer-program product. Further, as described above, the servers (interactive media server, media statistics server, indexing server, video provider server, and directory server) described herein are server programs executed on server devices, each server device including an associated processor and non-volatile memory configured to store the server program. The processor of each server device is configured to execute the server program using portions of volatile memory. Further search interface 104 may be a dedicated web server device having a processor and associated stored program in non-volatile memory that is configured to serve a search interface, or may be an API served by an application server of similar construction to various computing devices. The interactive media device and developer computing device likewise have associated processors, non-volatile memory, volatile memory, and stored programs for implementing the functions described herein.

Figure 3:
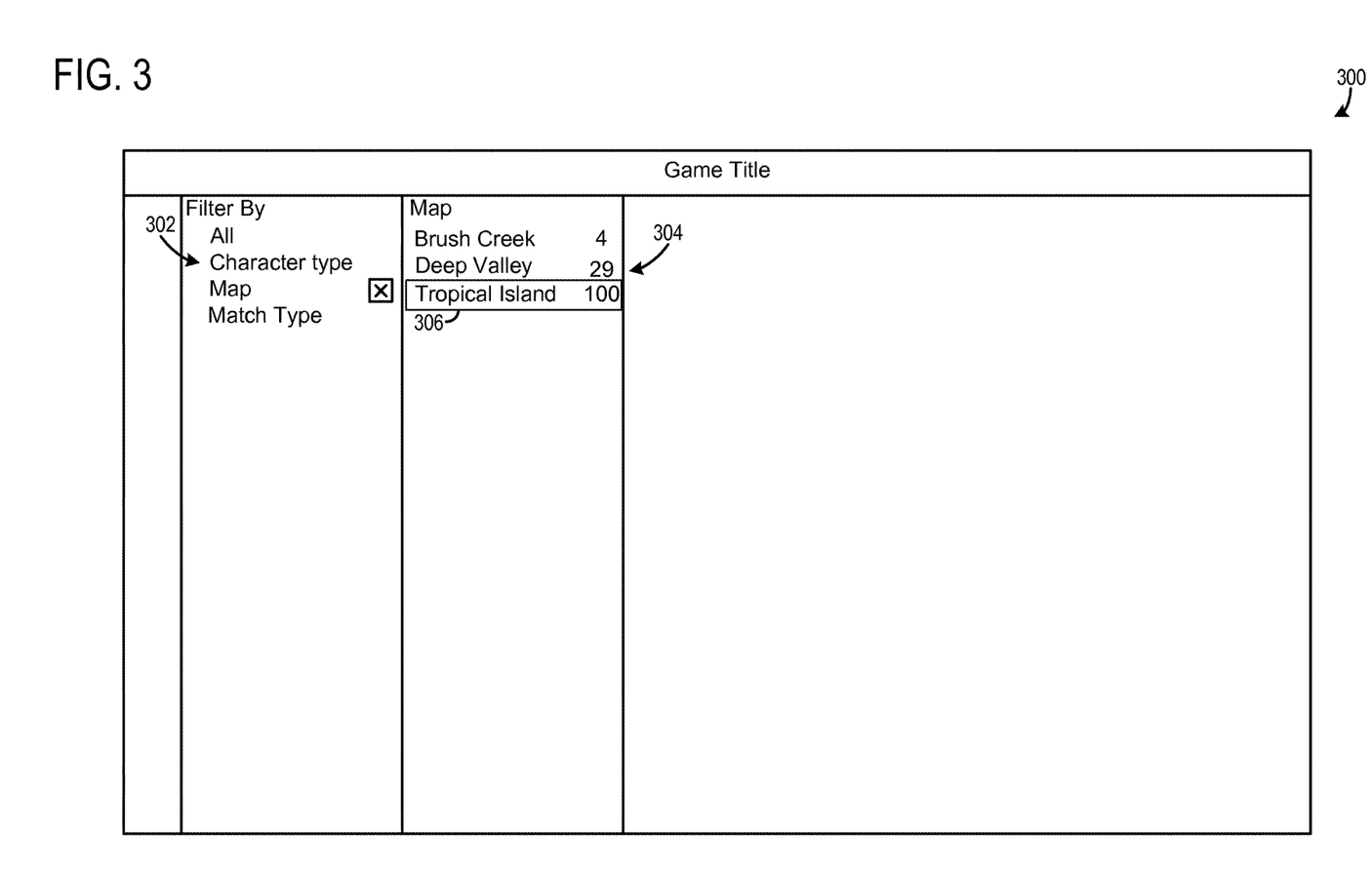
FIGS. 3 and 4 show search interfaces for searching interactive media broadcast streams and interactive media clips.

FIG. 3 shows an example search interface 300 where an interactive media title (e.g., game title) may be filtered by various categories 302 such as map, character type, and match type. It will be appreciated that the interactive media title may have a plurality of associated live broadcast video streams of interactive media sessions. As shown, when the map filter is selected a number of types of maps 304 are shown with the number of corresponding video links. Thus each category can include a plurality of fields. The user may select a specific map 306 to further narrow the search. It will be appreciated that the categories may be metadata associated with statistical data generated by the statistics engine, described above with regard to FIG. 1. Selecting a category may refine a search for live broadcast video streams and provide links to live broadcast video streams associated with the selected category. In this way, the search interface can be used to quickly return relevant video streams corresponding to live interactive media sessions.

Figure 4:
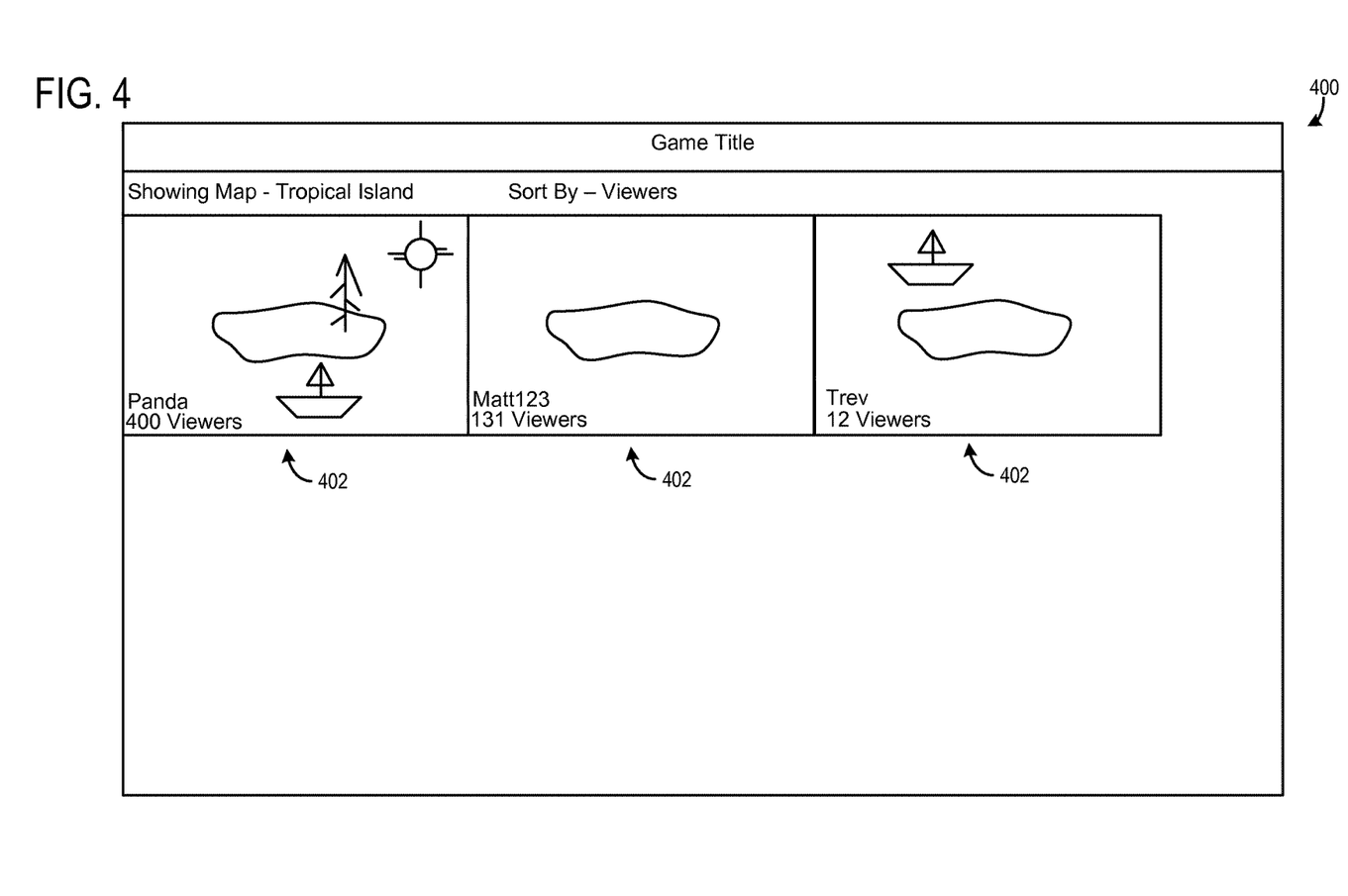

FIG. 4 shows another example search interface 400 where the specific map 306 (i.e., Tropical Island"), shown in FIG. 3, is chosen and links 402 to video data corresponding to the map type are displayed. Specifically, the links 402 may corresponding to live broadcast video streams provided via the video provider server or the directory server. It will be appreciated that clicking or otherwise selecting the links 402 can prompt streaming of a corresponding live broadcast video.

Figure 5:
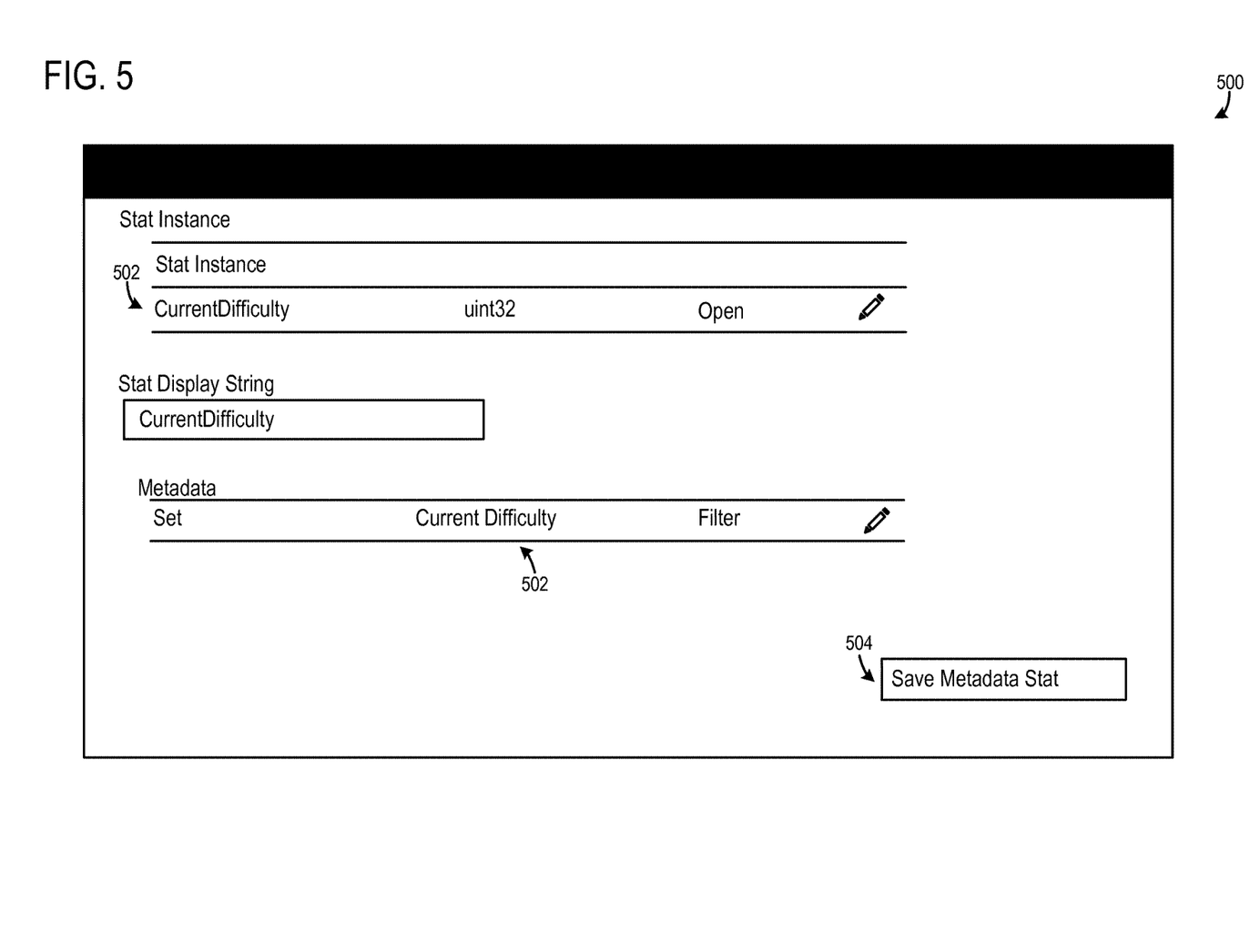
FIG. 5 shows a developer interface which may be generated by the developer tool shown in the system depicted in FIG. 1.

FIG. 5 shows a developers interface 500 which may be used by a developer to define the type of statistical data that is selected by the statistics engine. It will be appreciated that he search interfaces shown in FIGS. 3 and 4 and the developer interface 500 shown in FIG. 5 are examples of interfaces that may be provided by the system 50 shown in FIG. 1 or via the method 200 shown in FIG. 2. The developer interface 500 includes fields 502 that enable statistics instances to be selected or input into the interface. It will be appreciated that selecting or entering the statistics instances can enable the statistics engine to gather statistics data associated with the statistics instances. In this way, a developer can select the statistics data that is collected according to their predilection. A button 504 is provided to save the stat instance. As a result, a developer can customize the types of statistical data which is collected by the system.

Figure 6:
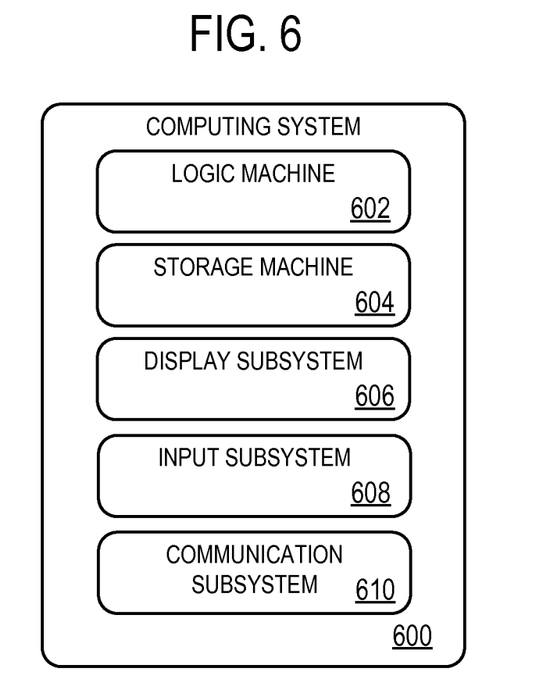
FIG. 6 schematically depicts a non-limiting embodiment of a computing system in accordance with an embodiment of the present disclosure.

FIG. 6 schematically shows a non-limiting embodiment of a computing system 600 that can enact one or more of the methods and processes described above. Computing system 600 is shown in simplified form. Computing system 600 may take the form of a touch-screen display device, as well as any other suitable computing system, including but not limited to interactive media consoles (e.g., game consoles), one or more personal computers, server computers, tablet computers, home-entertainment computers, network computing devices, interactive media devices, mobile computing devices, mobile communication devices (e.g., smart phone), and/or other computing devices.

Computing system 600 includes a logic machine 602 and a storage machine 604. Computing system 600 may also include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," "application," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," "application," and "engine" may encompass individual or groups of executable files, data files, libraries, drivers, scripts, database records, etc.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, and/or controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, a wired or wireless local- or wide-area network, etc. In some embodiments, the communication subsystem may allow computing system 600 to send and/or receive messages to and/or from other devices via a network such as the Internet.

The subject matter of the present disclosure is further described in the following paragraphs. According to one aspect, a method for providing searchable streaming video broadcasts generated from a plurality of interactive media sessions at an interactive media server, wherein the interactive media server generates a live broadcast video stream for each of the interactive media sessions and a video provider server providing a connection to the live broadcast video stream for viewing is provided. The method includes at a statistics server, receiving an interactive media interactive media events stream for each interactive media session from the interactive media server, generating statistics data for each interactive media session based upon the events stream. The method further includes at an indexing server, generating a searchable index of a directory of live broadcast video streams, the searchable index including a plurality of entries, each entry including (a) a link to the live broadcast video stream for a corresponding interactive media session provided by the video provider server, and (b) metadata associated with the corresponding interactive media session, the metadata being generated based upon the statistics data for the corresponding interactive media session.

In this aspect, the method may further comprise, providing a search interface configured to receive a search query from a computing device, look up one or more terms in the search query in the searchable index, and send to the computing device a displayable list of one or more search results including at least one of the links corresponding to one of the live broadcast video streams provided by the video provider server.

In this aspect, the search query may include filters and search options related to the metadata.

In this aspect, the method may further comprise programmatically sending a list of links to live broadcast video streams based on user inputs generated via an interactive media device from the indexing server to the interactive media device.

In this aspect, a portion of the statistics data that is generated may be determined by applying statistics rules set by a developer.

In this aspect, the method may further comprise altering the statistics rules in response to receiving a rule change request from a developer computing device.

In this aspect, the live broadcast video stream may include at least one of microphone input data and video input data from an interactive media device.

In this aspect, the metadata may be time stamped corresponding to a temporal location in the live broadcast video stream.

In this aspect, the method may further comprise maintaining on a directory server the directory of the live broadcast video stream provided by the video provider server for each interactive media session, the directory including a list of links to live broadcast video streams for each interactive media session on the video provider server.

In this aspect, the step of generating the searchable index may be implemented in near real-time.

In another aspect, a system for providing searchable video data generated from a plurality of interactive media sessions at an interactive media server, wherein the interactive media server generates a live broadcast video stream for each of the interactive media sessions and a video provider server provides connections to the video data for viewing is provided. The system comprises one or more computing devices each having at least one processor and associated memory, the processor configured to execute the following software programs: a statistics engine configured to receive an interactive media interactive media events stream for each interactive media session from the interactive media server, generate statistics data for each interactive media session based upon the events stream, and an indexing engine configured to generate a searchable index of a directory of the live broadcast video streams, the searchable index including a plurality of entries, each entry including (a) a link to the live broadcast video stream for a corresponding interactive media session provided by the video provider server, and (b) metadata associated with the corresponding interactive media session, the metadata being generated based upon the statistics data for the corresponding interactive media session.

In this aspect, the indexing server may be configured to provide a search interface configured to receive a search query from a computing device, look up one or more terms in the search query in the searchable index, and send to the computing device a displayable list of one or more search results including at least one of the links corresponding to one of the live broadcast video streams provided by the video provider server.

In this aspect, the media statistics server may be further configured to inhibit indexing of the selected portion of the statistics data when an interactive media session is discontinued.

In this aspect, the metadata may be time stamped corresponding to a temporal location in the corresponding live broadcast video stream.

In this aspect, the method may further comprise a directory server configured to maintain the directory of the live broadcast video stream provided by the video provider server for each interactive media session, the directory including a list of links to live broadcast video streams for each interactive media session on the video provider server.

In this aspect, the statistics data may include one or more of map type, weapon type, tool type, points data, and level data.

In this aspect, the indexing engine may be configured to update the searchable index periodically based on the live broadcast video streams.

In another aspect, a method for providing searchable streaming video broadcasts generated from a plurality of interactive media sessions at an interactive media server, wherein the interactive media server generates a live broadcast video stream for each of the interactive media sessions and a video provider server providing a connection to the live broadcast video stream for viewing is provided. The method includes maintaining on a directory server the directory of the live broadcast video stream provided by the video provider server for each interactive media session, the directory including a list of links to live broadcast video streams for each interactive media session on the video provider server, at a media statistics server, receiving an interactive media interactive media events stream for each interactive media session from the interactive media server, generating statistics data for each interactive media session based upon the events stream, and at an indexing server, generating a searchable index of the directory, the searchable index including a plurality of entries, each entry including (a) a link to the live broadcast video stream for a corresponding interactive media session provided by the video provider server, and (b) metadata associated with the corresponding interactive media session, the metadata being generated based upon the statistics data for the corresponding interactive media session.

In this aspect, the method may further comprise programmatically sending a list of links to live broadcast video streams based on user inputs generated via an interactive media device from the indexing server to the interactive media device.

In this aspect, the metadata may be time stamped corresponding to a temporal location in the live broadcast video stream.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for providing searchable streaming video broadcasts, the method comprising:
at an interactive media server, generating a live broadcast video stream for each of a plurality of interactive media sessions generated in response to a plurality of users interacting with interactive media applications on interactive media devices, wherein a state of the interactive media application and statistics produced by user input are associated with the live broadcast video stream and a video provider server provides a connection to the live broadcast video stream for viewing;
at a statistics server, receiving an interactive media events stream for each interactive media session from the interactive media server, the interactive media events stream generated by the user interacting with the interactive media application that generates interactive events including a state of the interactive media application in the interactive media events stream based on and in response to user input with the interactive media application, the interactive media events stream including at least one interactive media event;
generating data for each interactive media session based upon user interaction with the interactive media application, the data including the state of the interactive media application and statistics data about the interactive events in the interactive media events stream to be used for searching content available for viewing in near real-time and at a future time by a plurality of users; and
at an indexing server, generating a searchable index of a directory of live broadcast video streams or recordings of live broadcast video streams stored in a database, the searchable index searchable by data generated by user interaction with interactive media applications and including a plurality of entries, each entry including (a) a link to the live broadcast video stream or a recorded live broadcast video stream for a corresponding interactive media session provided by the video provider server, and (b) metadata associated with the corresponding interactive media session, the metadata being generated based upon the data for the corresponding interactive media session including the state of the interactive media application and the statistics data and used for subsequent searching by the plurality of users.

2. The method of claim 1, further comprising, providing a search interface configured to:
receive a search query from a computing device;

look up one or more terms in the search query in the searchable index; and send to the computing device a displayable list of one or more search results including at least one of the links corresponding to one of the live broadcast video streams provided by the video provider server.

3. The method of claim 2, where the search query includes filters and search options related to the metadata.

4. The method of claim 2, further comprising programmatically sending a list of links to live broadcast video streams based on user inputs generated via the interactive media devices from the indexing server to the interactive media devices.

5. The method of claim 1, where a portion of the statistics data that is generated is determined by applying statistics rules set by a developer.

6. The method of claim 5, further comprising altering the statistics rules in response to receiving a rule change request from a developer computing device.

7. The method of claim 1, where the live broadcast video stream includes at least one of microphone input data and video input data from the interactive media device.

8. The method of claim 1, where the metadata is time stamped corresponding to a temporal location in the live broadcast video stream.

9. The method of claim 1, further comprising maintaining on a directory server the directory of the live broadcast video streams provided by the video provider server for each interactive media session, the directory including a list of links to live broadcast video streams for each interactive media session on the video provider server.

10. The method of claim 1, where the step of generating the searchable index is implemented in near real-time.

11. A system for providing searchable video data, the system comprising:
an interactive media server to generate a plurality of interactive media sessions and a live broadcast video stream for each of the interactive media sessions in response to a plurality of users interacting with interactive media applications on interactive media devices, wherein a state of the interactive media application and statistics produced by user input are associated with the live broadcast video stream;
a video provider server to provide connections to the video data for viewing;
one or more computing devices each having at least one processor and associated memory, the processor configured to execute the following software programs:
a statistics engine configured to:
receive an interactive media events stream for each interactive media session from the interactive media server, the interactive media events stream generated by the user interacting with the interactive media application that generates interactive events including a state of the interactive media application in the interactive media events stream based on and in response to user input with the interactive media application, the interactive media events stream including at least one interactive media event;
generate data for each interactive media session based upon user interaction with the interactive media application, the data including the state of the interactive media application and statistics data about the interactive events in the interactive media events stream to be used for searching content available for viewing in near real-time and at a future time by a plurality of users; and
an indexing engine on an indexing server configured to generate a searchable index of a directory of the live broadcast video streams or recordings of live broadcast video streams stored in a database, the searchable index searchable by data generated by user interaction with interactive media applications and including a plurality of entries, each entry including (a) a link to the live broadcast video stream or a recorded live broadcast video stream for a corresponding interactive media session provided by the video provider server, and (b) metadata associated with the corresponding interactive media session, the metadata being generated based upon the data for the corresponding interactive media session including the state of the interactive media application and the statistics data and used for subsequent searching by the plurality of users.

12. The system of claim 11, where the indexing server is configured to provide a search interface configured to:
receive a search query from a computing device;
look up one or more terms in the search query in the searchable index; and
send to the computing device a displayable list of one or more search results including at least one of the links corresponding to one of the live broadcast video streams provided by the video provider server.

13. The system of claim 11, where the indexing server is further configured to inhibit indexing of a selected portion of the statistics data when the interactive media session is discontinued.

14. The system of claim 11, where the metadata is time stamped corresponding to a temporal location in the corresponding live broadcast video stream.

15. The system of claim 11, further comprising a directory server configured to maintain the directory of the live broadcast video streams provided by the video provider server for each interactive media session, the directory including a list of links to live broadcast video streams for each interactive media session on the video provider server.

16. The system of claim 11, where the statistics data includes one or more of map type, weapon type, tool type, points data, and level data.

17. The system of claim 11, where the indexing engine is configured to update the searchable index periodically based on the live broadcast video streams.

18. A method for providing searchable streaming video broadcasts, the method comprising:
at a plurality of interactive media devices, implementing interactive media sessions that include generation of interactive media events streams, each media event stream being based upon a user interacting with a corresponding interactive media device via an interactive media application;
at an interactive media server:
receiving the interactive media events streams; and
sending video data to a video provider server;
at a media statistics server, generating data based on the interactive media events stream including at least one state of the interactive media application and statistics data related to the interactive media session;
at an indexing server, generating a searchable index of a directory of live broadcast video streams including a plurality of entries, each entry including a link to the live broadcast video stream for a corresponding interactive media session and metadata associated with the corresponding interactive media session based on the statistics data; and receiving search queries from a plurality of users from computing devices at a search interface to locate entries in the searchable index and access links to the live broadcast video streams.

\* \* \* \* \*